W. ADAMSON.
THREE WAY VALVE.
APPLICATION FILED MAR. 4, 1908.

916,403.

Patented Mar. 30, 1909.

WITNESSES:
Mathew J. Marty
C. F. Bassett

INVENTOR
William Adamson
BY Frederick Benjamin
ATTY.

UNITED STATES PATENT OFFICE.

WILLIAM ADAMSON, OF ROCK ISLAND, ILLINOIS.

THREE-WAY VALVE.

No. 916,403.  Specification of Letters Patent.  Patented March 30, 1909.

Application filed March 4, 1908. Serial No. 419,126.

*To all whom it may concern:*

Be it known that I, WILLIAM ADAMSON, a citizen of the United States, residing at Rock Island, in the county of Rock Island and State of Illinois, have invented certain new and useful Improvements in Three-Way Valves, of which the following is a specification.

My invention relates to valves and refers particularly to that class commonly designated as three way valves.

The paramount objects of the improvements which form the subject matter of this application are:—to provide a simple, durable and easily manipulated device of the class stated; to furnish a three way valve so designed that one way cannot be closed without opening the other, and to supply a valve that will be practicable when used with a variety of fluids, such as steam, water, air, or ammonia.

Other objects of my improvements are to provide a three way valve that may be arranged with either screw or lever movement so that the action may be quick or slow as desired; to furnish a construction that will present practically a straight way, and to produce an appliance that can be readily taken apart for the purpose of regrinding the valve seats or making other repairs.

Further objects of the device hereinafter described are to provide a valve admirably suited to the requirements of such apparatus and so constructed as to require no springs, internal stuffing boxes or automatic devices which are prone to get out of order, to furnish a valve that can be manufactured at a comparatively small cost, and that can be repaired by any one not possessing special skill.

Further advantages of this invention may be stated, such for instance as the adaptability of the valve to supply two boilers from a single pump without danger of shutting off both ways at once, as may happen when two valves are employed under like conditions. The valve will thus practically take the place of two valves and thus lessen the first cost besides eliminating the chances of mistakes being made by the operator.

I obtain the above results and others of minor importance by means of the apparatus illustrated in the accompanying drawing, forming a part of this application, and in which:—

Figure 1:
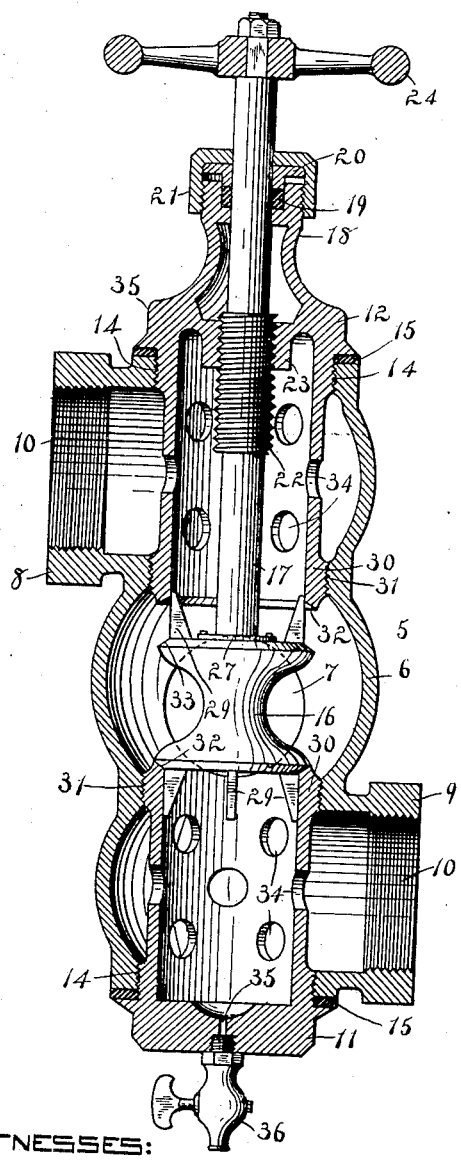
Figure 2:
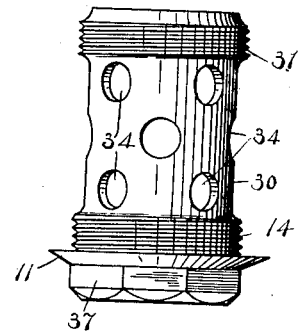
Figure 3:
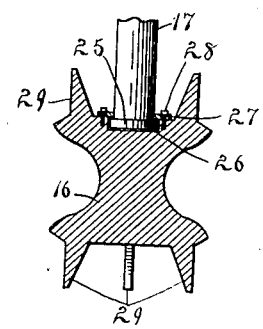

Figure 1 is a longitudinal sectional view of the preferred form of my improved three way valve; Fig. 2 is a side elevation of one of the caps, and Fig. 3 is a fragmentary view, showing the method of connecting the stem to the valve, the latter being in section.

Referring to the details of the drawing the numeral 5 indicates the valve casing, having a median globular valve chamber 6, furnished with an inlet port 7. The ends of the casing are approximately cylindrical and are supplied with discharge ports 8, 9, furnished with threads 10, for connection with pipes (not shown). The ends of the casing are closed by caps 11, 12, having external threads 14 engaging corresponding threads in the casing. Between the caps and the casing margins are interposed suitable gaskets 15. A valve 16 is located in the chamber 6 and has a stem 17 projecting through the upper cap 12 which has a reduced extension 18, bored to receive said stem. The part 18 is counterbored to receive a gasket 19 retained by a gland 20 secured in turn by a cap 21 having threaded connection with the extension 18. Intermediate the ends of said stem the latter is provided with threads 22 engaging a nut 23 formed integral with the cap 12.

The upper end of the stem 17 is provided with the usual hand wheel 24 and the lower end terminates in a collar 25 received in a socket 26 in the upper face of the said valve and retained in place by a plate 27, secured to the valve by screws 28, thus forming a swivel joint to prevent the valve from turning with the stem. The said valve is guided by lugs 29 projecting upward and downward and slidably engaging the inner surfaces of hollow cylindrical extensions 30 formed integral with the caps 11, 12, and furnished with threads 31 to engage similar threads in the casing walls. The margins of the extension 30 are chamfered or beveled, to form valve seats 32, which are engaged by similar beveled surfaces 33 on the valve. The said extensions are supplied with suitable openings 34 to permit the passage of the fluid passing through the system and at the same time protect the valve seats from dirt and debris. The cap 11 has a duct 35 communicating with the interior of the casing and governed by a cock 36.

The operation of the device will be readily understood since the valve is reciprocated by turning the hand wheel 24 to alternately open and close the discharge ports.

The caps 11, 12, are furnished with the usual faces 37 for the application of a wrench and when removed the valve seats may be reground.

Although the valve has a swivel connection with the stem and therefore will not follow the movement of the latter positively, yet the lugs 29 will have a certain amount of lateral movement in the cylinders 30 so that the valve will have a slow and irregular rotary motion, causing a uniform wear in the valve seats.

Having thus described my invention, what I claim as new, is:—

1. In a valve, the combination of a casing having an inlet port and a plurality of outlet ports, caps for said casing, cylindrical extensions projecting into the casing from said caps, and having openings communicating with the outlet ports, a valve chamber located between said extensions and communicating with the inlet port, a valve slidably arranged in said chamber and an operating stem for the valve projecting externally to the casing.

2. In a valve, the combination of a casing having inlet and outlet ports, caps for said casing, cylindrical hollow extensions projecting inwardly from said caps, and having openings communicating with the outlet ports, a valve chamber arranged between and communicating with said extensions, a valve in said chamber arranged to slide longitudinally, a plurality of valve seats for the valve, and a stem for the valve projecting externally to the casing.

3. In a valve, the combination of a casing having outlet ports, a valve chamber located between said outlet ports and having an inlet port, a valve controlling said inlet port, guides attached to said valve and slidably engaging the casing above and below said valve, a plurality of removable valve seats for the valve, and a stem having a swivel connection with said valve.

4. In a valve, the combination of a casing, having an inlet port and a plurality of outlet ports, caps for said casing, cylindrical extensions projecting inwardly from said caps, and having openings communicating with the outlet ports, a valve chamber between said extensions, a slidable valve in said chamber arranged to alternately engage valve seats in said extensions, and an operating stem having a swivel connection with said valve.

5. In a valve, the combination with a casing having inlet and outlet ports, and caps for said casing, of cylindrical extensions projecting inwardly from said caps, and having openings communicating with the outlet ports, a valve chamber located between and communicating with said extensions, a valve in said chamber, guides attached to said valve and slidably engaging said extensions, and a stem having a swivel connection with said valve.

6. In a valve, the combination with a casing having an inlet port and a plurality of outlet ports, caps for said casing, cylindrical extensions projecting inwardly from said caps, said extensions having openings communicating with the outlet ports and provided with valve seats, a slidable valve arranged between the said extensions and adapted to alternately engage said valve seats, and guides attached to said valve and slidably engaging said extensions.

In testimony whereof I affix my signature in the presence of two witnesses.

WILLIAM ADAMSON.

Witnesses:
H. J. PEACOCK,
W. H. WISE.